United States Patent [19]

Reihl et al.

[11] Patent Number: 5,052,746
[45] Date of Patent: Oct. 1, 1991

[54] VEHICLE ROOF WITH WIND DEFLECTOR

[75] Inventors: Peter Reihl, Munich; Arpad Fuerst, Germering, both of Fed. Rep. of Germany

[73] Assignee: Webasto AG Fahrzeugtechnik, Fed. Rep. of Germany

[21] Appl. No.: 525,602

[22] Filed: May 21, 1990

[30] Foreign Application Priority Data

May 24, 1989 [DE] Fed. Rep. of Germany ....... 3916906

[51] Int. Cl.$^5$ .............................................. B60J 7/22
[52] U.S. Cl. .................................... 296/217; 296/222
[58] Field of Search ......................... 296/216, 217, 222

[56] References Cited

U.S. PATENT DOCUMENTS 3,922,032 11/1975 Schaller ............................ 296/217
4,911,497 3/1990 Schreiter et al. ................... 296/222

FOREIGN PATENT DOCUMENTS 578111 6/1933 Fed. Rep. of Germany .
3426998 1/1986 Fed. Rep. of Germany ...... 296/217
3539987 5/1987 Fed. Rep. of Germany .

Primary Examiner—Dennis H. Pedder
Attorney, Agent, or Firm—Sixbey, Friedman, Leedom & Ferguson

[57] ABSTRACT

A vehicle roof with a roof opening made in the stationary roof panel is described, wherein the roof opening can alternately be closed or at least partially opened by an adjustable covering that moves in the longitudinal direction of the vehicle combined with a wind deflector that includes a wind deflector plate mounted to pivot between a pushed-out position and a rest position around a transverse pivoting axis, which can be adjusted along a guide mechanism in the longitudinal direction of the vehicle. The wind deflector when pivoted into the rest positions can be pushed into a receiving space located below the stationary roof panel in front of the front edge of the roof opening. A catch mechanism is provided for automatic slaving the transverse pivot axis of the wind deflector plate for movement in the longitudinal direction of the vehicle with a part connected to the cover during at least a part of the adjustment movement of the covering that occurs in the longitudinal direction of the vehicle.

11 Claims, 8 Drawing Sheets

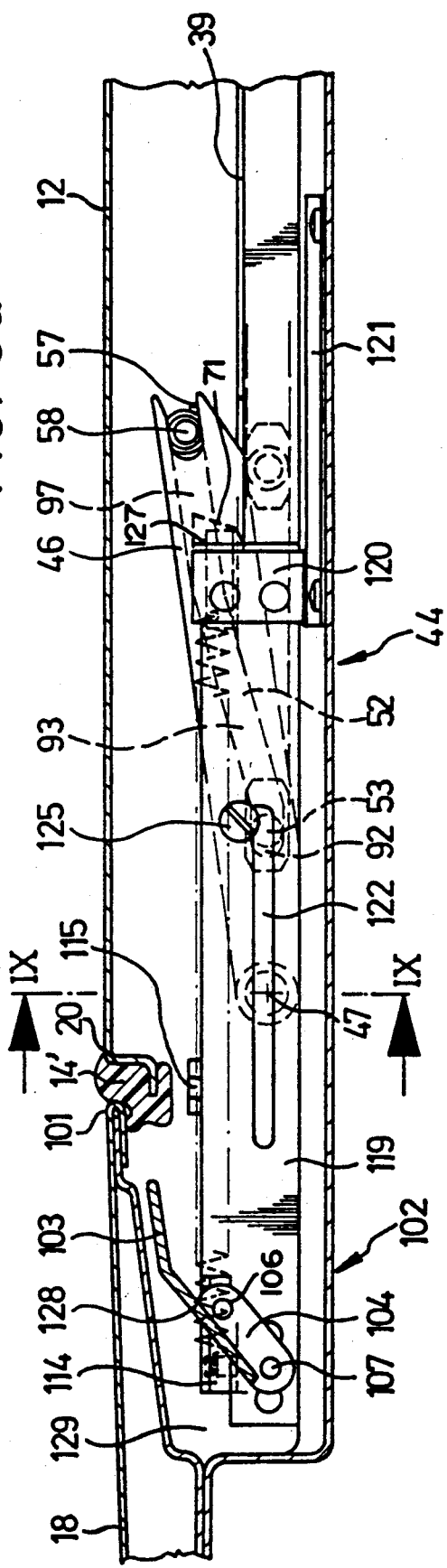
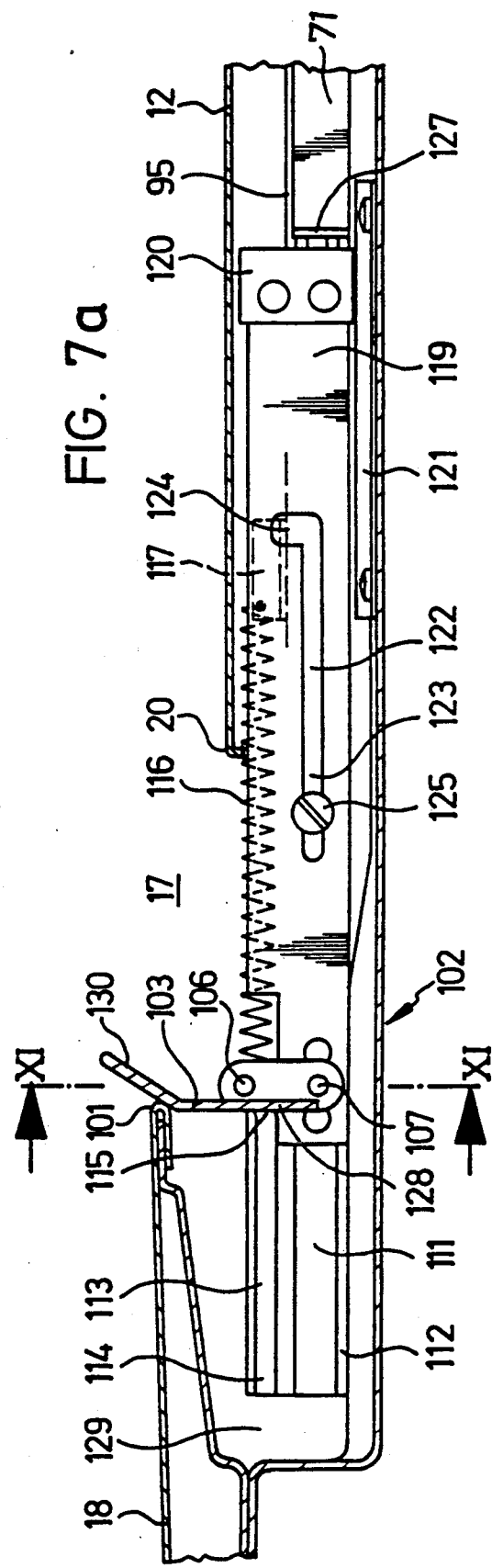

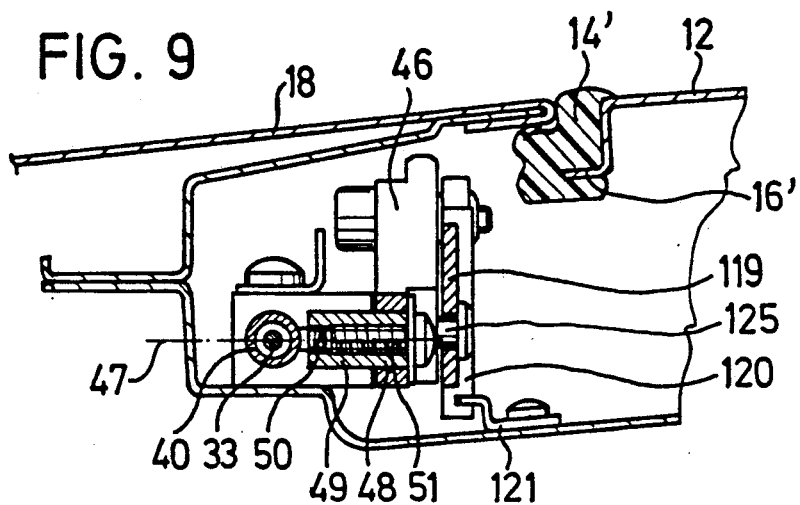
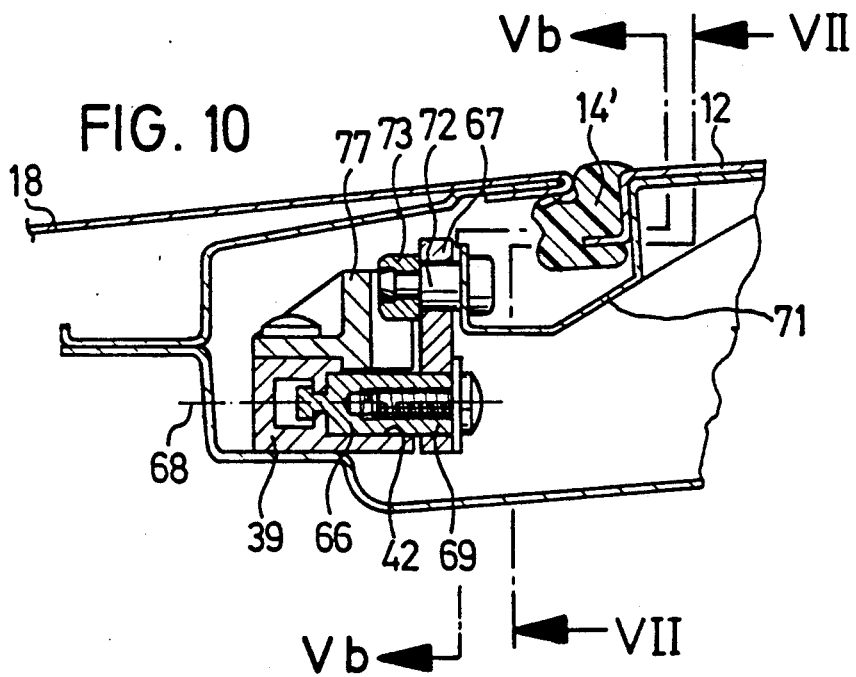
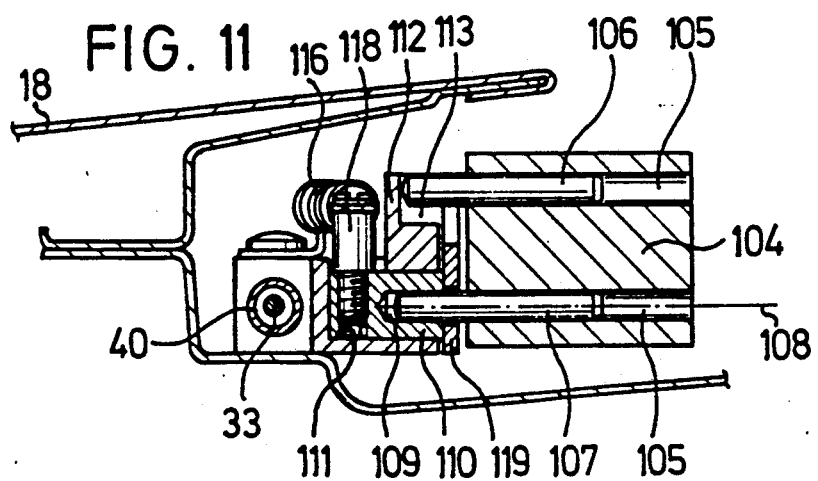

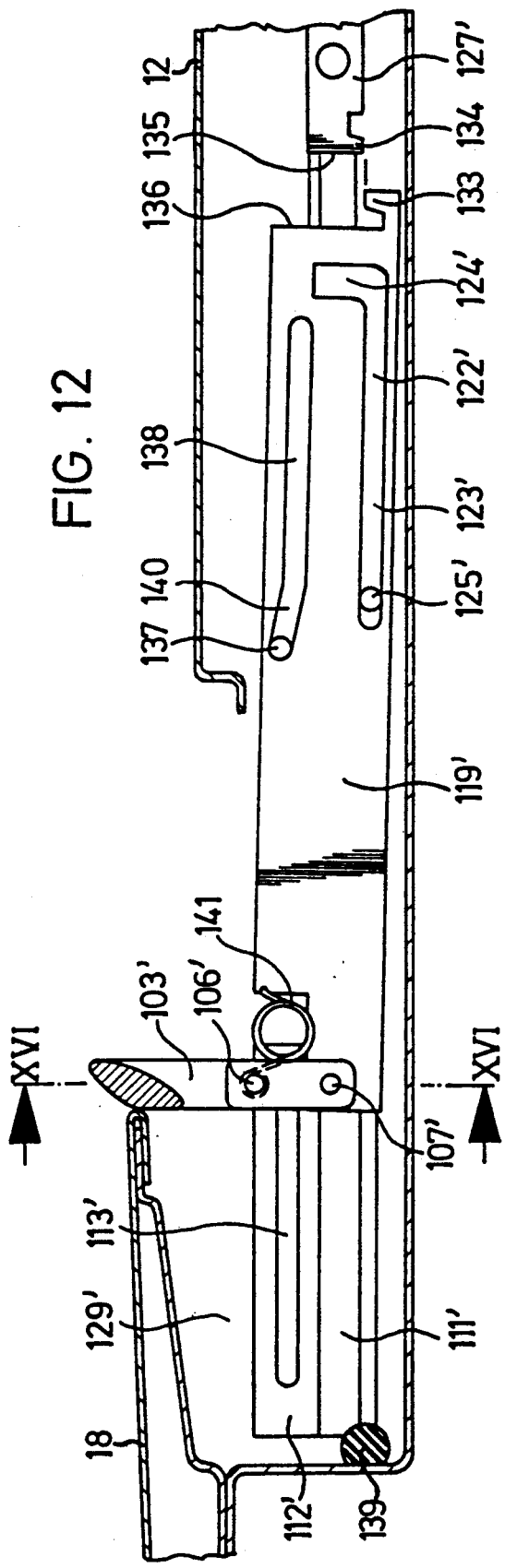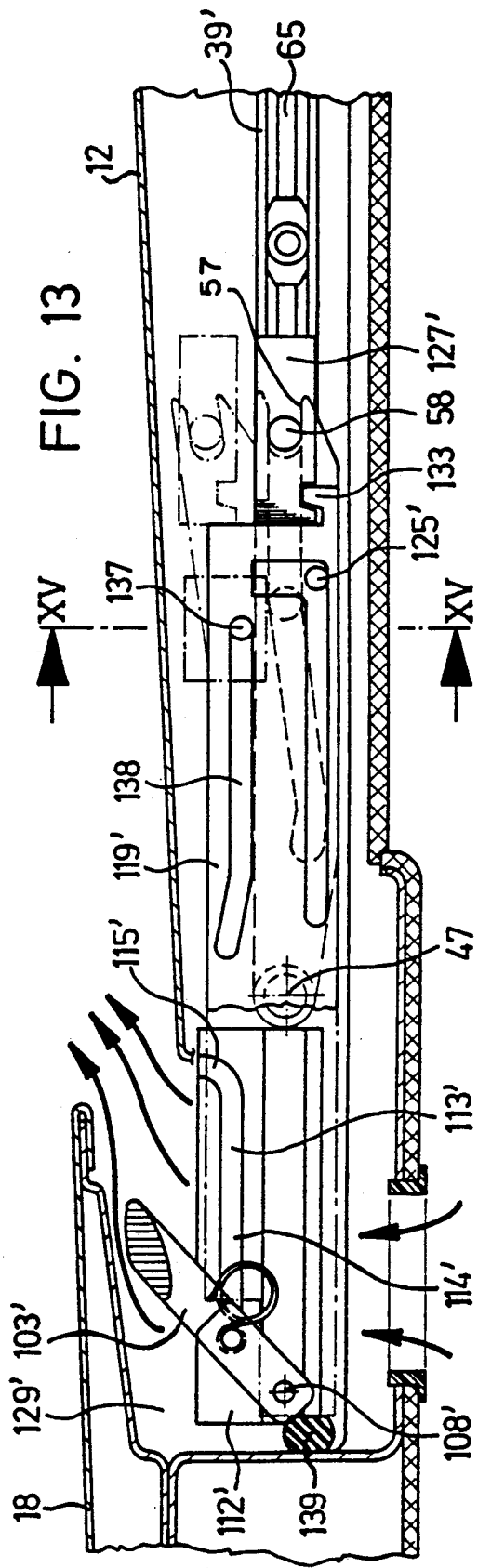

VEHICLE ROOF WITH WIND DEFLECTOR

TECHNICAL FIELD

The present invention relates to a vehicle roof with a roof opening made in the stationary roof panel, wherein the roof opening can alternately be closed or at least partially opened by an adjustable cover that is movable in vehicle longitudinal direction combined with a wind deflector. More particularly, the wind deflector according to the present invention comprises a wind deflector plate that is mounted to pivot about a pivot axis running transverse to the vehicle longitudinal direction between a pushed-out position and a rest position, wherein the pivot axis can be adjusted along a guide mechanism in the vehicle longitudinal direction so that the wind deflector when in the rest position can be urged into a receiving space lying below the stationary roof panel in front of the front edge of the roof opening.

BACKGROUND OF THE INVENTION

In a known vehicle roof described in German Patent No. 578,111, intended for recreational vehicles, several wind deflector plates are provided which, after opening a folding covering, can be adjusted not only in their slope but can also be freely slid lengthwise on upper longitudinal carriers of the side walls of the vehicle body. In doing so, the deflector plates can be set at any distance from one another as a function of the direction and strength of the wind. The wind deflector plates are then held in the respectively set positions in a way not shown in greater detail. To close the covering, first, obviously by hand, the wind deflector plates are shifted forward and are reversed so that they can be pushed underneath a stationary, front roof dome. Afterwards, the covering is brought forward out of its folded pushed-back position and closed. The handling of the known vehicle roof is disadvantageously complicated.

Other wind deflector arrangements are known having a wind deflector plate supported in the area of the front edge of a roof opening that can be closed by a cover, wherein the wind deflector is automatically adjusted between an operating position and a rest position as a function of the adjustment movement of the cover. One such device is described in German Offenlegungsschrift No. 3,426,998, which discloses a wind deflector plate that is linked in the area of its upper edge, in a pushed-out position, to the front end of two push-out arms, that are further linked at their rear ends to lateral portions of a roof frame. In this case, the wind deflector plate is elastically prestressed relative to the push-out arms, and the push-out arms are further biased away from the roof frame toward the operating position. The wind deflector plate carries, on the exposed edge facing away from the push-out arms, a cam that rides on a cam track fixedly positioned with the roof. As the cover is brought into its closed position, the push-out arms are pivoted so that the push-out arms tip the wind deflector plate rearward and at least partially push it forward below a part of the stationary roof surface that borders the front edge of the roof opening. At the same time, the cam slides along the cam track.

In yet another known wind deflector described in German Offenlegungsschrift No. 3,539,987, a wind deflector plate is provided that is S-shaped in cross section and is elastically prestressed into a pushed-out position. Moreover, the wind deflector is mounted to pivot around an axis that is fixed in position with the roof wherein the axis is placed in front of the roof opening and below the stationary roof panel. A connecting rod is linked to the wind deflector plate that interacts with a catch on a front cover bearing so as to rotate the wind deflector plate around its fixed axis into the position when the cover approaches its closed position.

It is also known for a sliding roof, as disclosed in German Offenlegungsschrift No. 2,505,736, to pivotally link a wind deflector plate to a mounting that is further pivotally connected about a fixed axis lying in front of the front edge of the roof opening, wherein the mounting is flexibly connected to pivoted levers. These pivoted levers are also mounted to pivot about torsionally rigid axes, and they interact with sliding blocks on the sliding cover to lower the pivoting axis that connects the wind deflector plate to the mounting and that is located near the front edge of the roof opening when the cover moves into its closed position. Here, a sealing bead sitting on the cover front edge strikes the wind deflector plate and pivots the latter against spring tension with respect to the lowered mounting until the wind deflector plate disappears below the stationary roof surface.

These known wind deflector arrangements are commonly related in that their application is limited to certain specific roof types, such as sliding roofs, sliding-lifting roofs and spoiler roofs. In particular, these known wind deflector arrangements are not suited for ventilation roofs. See as an example of a ventilation roof, allowed commonly owned U.S. patent application Ser. No. 320,549, filed Mar. 8, 1989. Such ventilation roofs include a cover whose front edge can be lowered by swinging the cover from a closed position into a ventilation position in which a ventilation gap is formed between the cover front edge and the front edge of the roof opening that can be closed by the cover. The above noted wind deflectors are not applicable to such a situation because, in such a case, the wind deflector would block or at least greatly impede the entry of air through the ventilation gap.

SUMMARY OF THE INVENTION

Thus, it is an object of the present invention to provide an easily operable vehicle roof combined with a wind deflector that is not limited to specific roof types but that is generally suitable for application to any of the known kinds of roof coverings and in particular to be used with a cover for a ventilation roof.

This object is achieved in accordance with the present invention for a vehicle roof having an opening therein which can be selectively closed or at least partially opened by a cover adjustable in the vehicle longitudinal direction combined with a wind deflector that is pivotal between a pushed-out position and a retracted position, wherein the axis of pivot is longitudinally adjustable, and in that a catch mechanism is provided for automatic carrying of the pivot axis of the wind deflector plate in the longitudinal direction of the vehicle during a part of the adjustment movement of the cover in the longitudinal direction of the vehicle.

In the case of the vehicle roof according to the present invention, the pivot axis of the wind deflector plate is automatically adjusted in the longitudinal direction of the vehicles as a function of the adjustment movement of the covering. In this way, the wind deflector can easily be stored in the retracted or rest position whereat the wind deflector does not impede the roof functions, such as to permit ventilation by lowering the front edge of a pivoted cover. Moreover, the wind deflector is advantageously positioned without requiring, in addition, further effort on the part of the driver or a passenger.

An especially simple structural design is achieved by a catch mechanism that comprises, on both sides of the roof opening, respectively, a thrust element that is guided to be adjustable in the longitudinal direction of the vehicle and that is brought into detachable engagement in at least one movement direction of the cover with a final control element that is fixed to move with the cover in the longitudinal direction of the vehicle.

In one embodiment of the present invention, the thrust element is elastically biased toward a position in which the thrust element carries the pivot axis of the wind deflector plate rearward into a position lying near the front edge of the roof opening. In this position, the final control element lies against the thrust element so that the final control element will force the thrust element and pivot axis forward against the elastic biasing force when the cover is brought toward its forwardmost longitudinal position. According to a modified embodiment, the thrust element is automatically coupled to the final control element for longitudinal movement in both directions when the cover is adjustably moved to the forwardmost position within a predetermined range, and this coupling is automatically released when the cover starting from the forwardmost position, is moved rearward by a predetermined amount.

Preferably, a pivoting mechanism is provided that forces the wind deflector plate to pivot during the sliding movement of the pivot axis of the wind deflector plate. This makes it possible to keep the receiving space for storing the wind deflector especially flat to thereby reduce the structural height of the receiving space. The pivoting mechanism preferably includes guides that are fixed with the roof and located on both sides of the roof opening, wherein the guide on each side interacts with a guide element of the wind deflector which is located at a spaced distance from the pivot axis of the wind deflector plate to thereby cause the wind deflector plate to pivot between the pushed-out position and the retracted rest position as a function of the sliding of the pivot axis in the longitudinal direction of the vehicle.

Advantageously, the wind deflector plate is made so that, in the pushed-out position, it simultaneously acts as a screen that covers the space lying below the front edge of the roof opening.

According to a preferred further development of the present invention, the cover swings in its forwardmost position about a pivot axis lying at or near the rear edge of the cover from a closed position into a ventilation position in which the cover front edge lies at a distance below the roof plane, while the cover rear edge is kept at least approximately at the height of the stationary roof panel. Then, after lowering the rear edge of the cover, the cover can be slid rearward below the stationary roof panel defining an open position which at least partially opens the roof opening. Furthermore, during the time that the cover is adjusted between the closed position and the ventilation position, the pivot axis of the wind deflector plate is kept in a forwardmost position and the wind deflector plate is maintained in the receiving space.

Thus, the wind deflector plate is additionally utilized when the wind deflector is pushed into its forwardmost position in the receiving space to form an air directing surface that guides an air stream from the vehicle interior directly to the gap produced between the front edge of the roof opening and the front edge of the cover when lowered into the ventilation position.

These and further objects, features and advantages of the present invention will become more apparent from the following description when taken in conjunction with the accompanying drawings which show, for the purposes of illustration only, several embodiments in accordance with the present invention.

BRIEF DESCRIPTION OF THE DRAWINGS

FIGS. 5a and 5b together show, on an enlarged scale, a longitudinal cross-section corresponding to FIG. 1, which illustrates the details of the adjustment mechanism of the cover and of the wind deflector assembly, with FIG. 5b taken along section line Vb—Vb of FIG. 10;

FIGS. 7a and 7b are longitudinal cross-sections corresponding to FIGS. 5a and 5b with the cover partially pushed back, with FIG. 7B taken along section line VII—VII of FIG. 10;

FIG. 9 is a partial cross-sectional view taken along line IX—IX of FIG. 5a;

FIG. 10 is a partial cross-sectional view taken along line X—X of FIG. 5b;

FIG. 11 is a partial cross-sectional view taken along line XI—XI of FIG. 7a;

FIG. 12 is a longitudinal cross-section corresponding to FIG. 7a for a modified embodiment of the ventilation roof in accordance with the present invention;

FIG. 13 is a partial longitudinal cross-section through the ventilation roof according to FIG. 12 with the cover in the ventilation position;

DETAILED DESCRIPTION OF THE PREFERRED EMBODIMENTS

Figure 1:
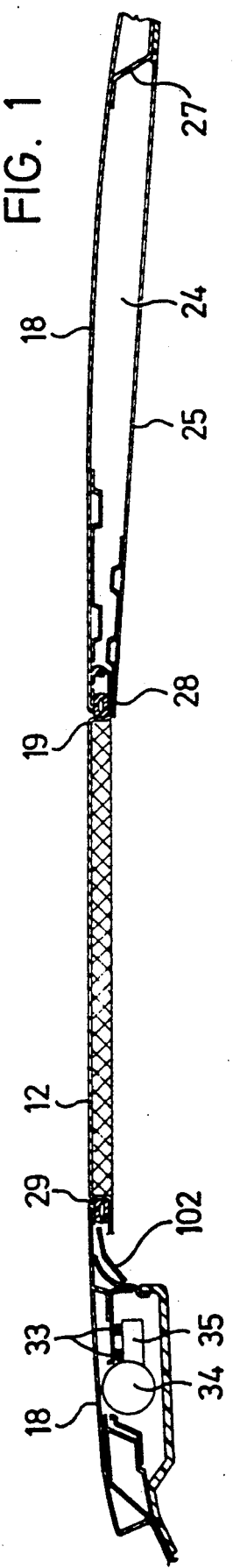
FIGS. 1 to 4 are longitudinal cross-sections through a ventilation roof with a wind deflector of the present invention showing an adjustable cover in different operative positions.

With reference now to the several Figures, and in particular to FIGS. 1-4, a vehicle roof is illustrated that exhibits a cover 12 provided with a peripheral, two-part seal 14 that is located on an offset edge flange 16 of the cover 12. It is also contemplated that instead of the two-part seal 14 as shown in FIGS. 1-4, a one-part seal 14 can be substituted as shown in FIGS. 5a, 5b, 6, 9, 10 and 15.

Referring back to FIG. 1, a roof opening 17 is provided in a stationary roof panel 18 which can be opened or closed by the cover 12. Cover 12 is pivotal about an imaginary pivot axis lying at or near its rear edge 19 by an adjustment mechanism (not shown in FIGS. 1-4, but described in detail below) between ventilation position illustrated in FIG. 2 and the closed position of FIG. 1. In the ventilation position, the cover front edge 20 is moved to a position spaced a distance below the normal closed roof plane indicated at 21. Furthermore, the cover rear edge 19 is kept at least approximately at the height of stationary roof panel 18. If, as a result of the travel of the vehicle, while in the ventilation position of FIG. 2, a partial vacuum is produced on the outside of roof panel 18 relative to the pressure prevailing in the vehicle interior, then an air stream 22 (FIG. 2) will be produced that is guided by a wind deflector 102 that is urge forward below roof panel 18. The vehicle interior is thereby ventilated by a gap 23 formed between the cover front edge 20 and the stationary roof panel 18.

The roof opening 17 is preferably made in a front portion of the stationary roof panel 18, that is toward the front of the vehicle, and can be at least partially opened by lowering the cover 12 along with its rear edge 19 to a position below the roof panel 18. The cover 12 is thus brought into a sliding position arranged essentially parallel to the roof plane 21 (FIG. 3), and can then be driven either manually or mechanically rearward under the roof panel 18 to the position illustrated in FIG. 4. Cover 12 is received within a space 24 formed between the portion of the roof panel 18 adjacent to a rear side of the roof opening 17 and a stationary inside roof lining 25 lying underneath the roof panel 18. During the course of driving the cover 12 rearwardly, the wind deflector 102 is also advantageously moved rearward by an amount such that it is clear of the roof so that it can be oriented to deflect an air stream that passes over roof opening 17. The manner of movement of the wind deflector 102 and its interrelationship to the movement of the cover 12 will be further understood with respect to the description below of the adjustment mechanism.

The stationary inside roof lining 25 can be linked in a way not described in greater detail, for example in the manner disclosed in U.S. patent application Ser. No. 320,549, filed Mar. 8, 1989 and incorporated herein by reference, at 26 to a cross strut 27 that is integral with the roof. Preferably, the inside roof lining 25 is adjustable about a transverse axis at 26 and is elastically biased upward at the front end 28 thereof. See FIGS. 1 and 2. Then, when the cover rear edge 19 is lowered into the sliding position, as shown in FIG. 3, the front edge of the stationary inside roof lining 25 is forced downward by the cover 12 against the upward bias so as to facilitate the sliding of the cover 12 into space 24. See FIGS. 3 and 4.

Figure 8:
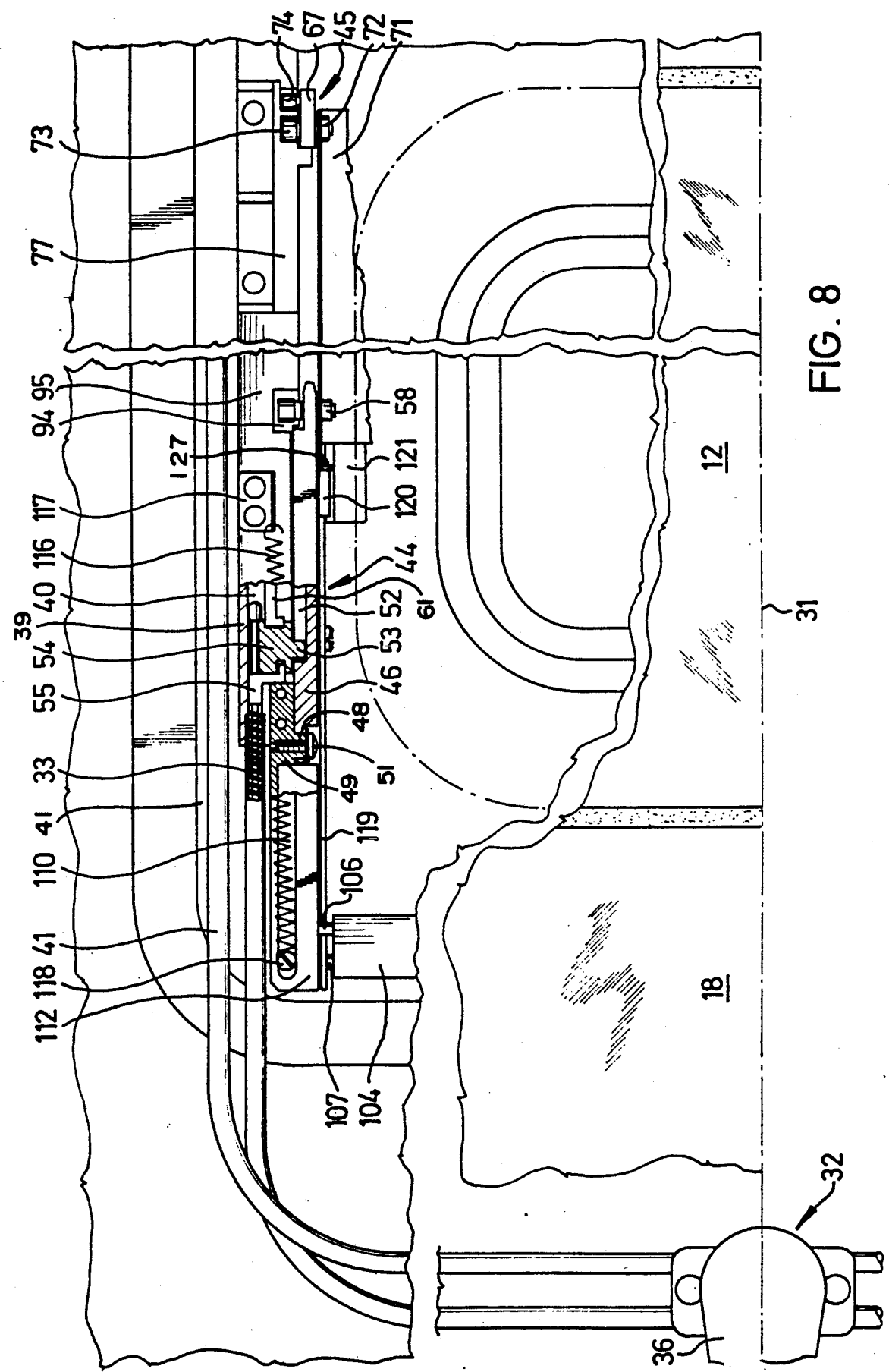
FIG. 8 is a partial top view of the ventilation roof of the present invention with the cover in the closed position corresponding to FIGS. 1, 5a and 5b.

The terms "front" and "rear" as applied to the vehicle roof and used throughout this application are based o the forward direction of travel of the motor vehicle in which the roof is installed. Furthermore, the vehicle roof as hereby explained, and particularly the adjustment mechanism therefore, is constructed essentially in mirror image symmetry with respect to a longitudinal central axis 31 as shown in FIG. 8. The detailed explanation below of the adjustment mechanisms and roof structure is directed to the right side of the vehicle roof, as viewed from the top, but it is understood that the description equally applies for the left side of the vehicle roof, except that the left side is a mirror image of the right side. Moreover, the drawings are limited to the right side for the same reason, and to include both sides would be merely duplicative.

The cover 12 is adjustably moved by a drive mechanism designated overall in FIGS. 1-4 by 32 that includes two drive cables 33, for example in the form of pressure-resistant threaded cables, that can be adjusted in the lengthwise direction thereof by a common drive mechanism. The drive motor 34 is provided with a reduction gear 35 operatively connected downstream to the drive motor 34 which functions as the drive mechanism. As an alternative to the drive motor 34, a drive mechanism in the form of a crank handle 36 such as that shown in FIG. 8 could be substituted therefore. Either drive motor 34 or 36 drives a pinion 37 that is drivingly connected with both drive cables 33.

On both sides of the roof opening 17, a longitudinally extended guide mechanism 39 is provided, which, for example, can be made as a guide rail mounted integrally with the roof or as part of a roof frame attached to the roof. Each of the longitudinal guide mechanisms 39 defines, as best seen in the cross-sectional views of guide mechanisms 39 in FIGS. 8 and 10, a cable guide channel 40 for drive cable 33 provided to drive the respective side of the roof, a cable guide channel 41 for the trailing end of drive cable 33 provided to drive the other side of the roof and a glide track 42. The guide track 42 is open toward the roof opening 17. Note that the nonmoving sheath for the trailing end of cable 33 is located within the channel 41, and the end of the sheath for the driving cable 33 is fixed to the guide mechanism 39 as seen in FIG. 8. With reference now to FIGS. 5-11, the adjustment mechanism for positioning the cover 12 in its plural operative positions is described. It is also noted that the adjustment mechanism and aforementioned guide channel of the present invention do not themselves constitute the present invention, which is specifically concerned with the combination thereof with a wind deflector as described in detail below. The adjustment mechanism and guide channel are the subject of copending commonly owned U.S. application Ser. No. 07/525,603 based on Federal Republic of Germany priority application P3916905.7 of May 24, 1989, which is fully incorporated herein by reference.

The adjustment mechanism includes a front height adjustment device 44 and a rear height adjustment device 45, each of which can be actuated independently of one another and each of which functions as an effect of the adjustment movement of the drive cables 33.

The front height adjustment device 44 includes a positively displaced pivoted lever 46 which is pivotally mounted at a forward end thereof for rotation about a stationary axis 47. The stationary axis 47 runs transverse to the direction that the cover slides and is at least approximately horizontal. To form the pivot, a link 49 is provided fixed with the roof and located adjacent to the front end of longitudinal guide mechanism 39, which includes a cylindrical projection 48 that extends through an opening at the front end of the pivoted lever 46. See FIGS. 8 and 9. The pivoted lever 46 and link 49 are secured together by a screw 51 that is screwed into a tapped hole 50 of link 49. A link track 52 is provided as a groove in the longitudinal direction along the pivoted lever 46 as seen in FIG. 8, into which a link journal 53 is slidably disposed. The link journal 53 is part of a catch 54 that is connected by an anti-torsion device 55 to the drive cable 33 so as to move longitudinally therewith. As seen in FIG. 5a, link track 52 merges into a guide track 57 near the rearward end of pivoted lever 46 that is open to the rear. A glide element 58 which is attached to the cover 12 or to a part 71 integrally formed with the cover (see FIGS. 8 and 10) is inserted into the guide track 57. The position of corresponds to the forward most position of the cover 12 as in FIG. 1.

Figure 5B:
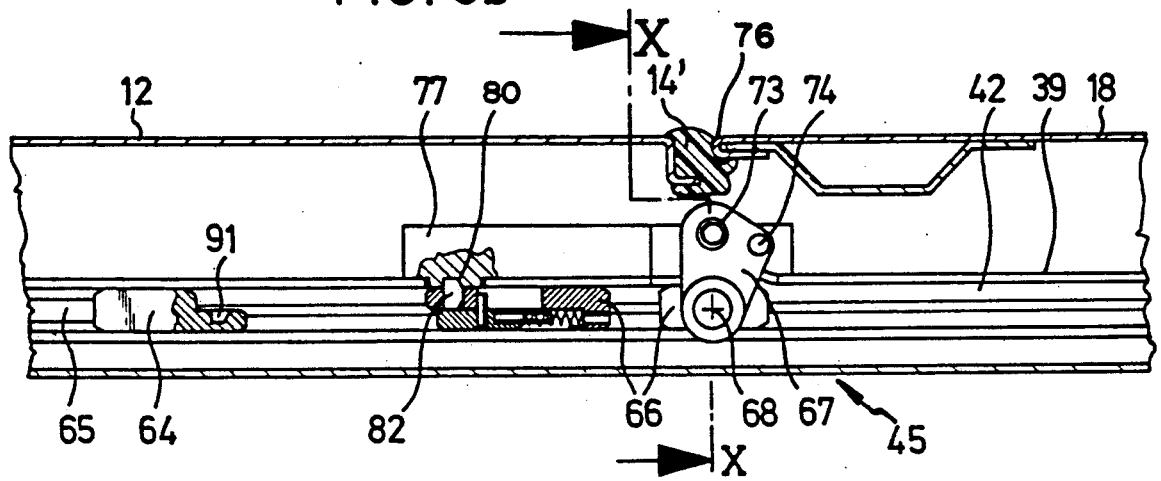
Figure 6:
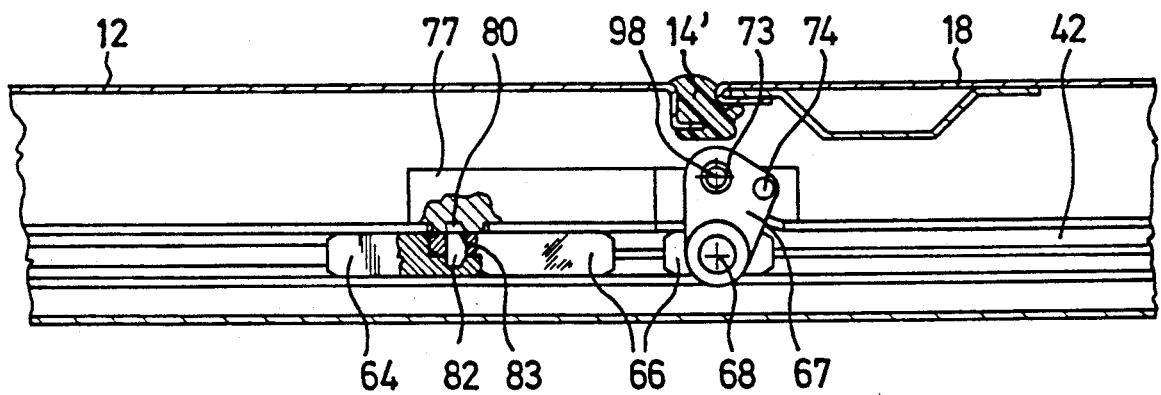
FIG. 6 is a partial longitudinal cross-section corresponding to FIG. 5b with the cover in the ventilation position according to FIG. 2, also taken along line Vb—Vb of FIG. 10.

Referring now to FIGS. 5b and 6, the rear height adjustment mechanism 45 is illustrated including a locking bar part 64 that is slidably guided in the longitudinal direction along glide track 42 of the longitudinal guide mechanism 39. The locking bar part 64 is permanently connected to catch 54 by a rod 65 and thus is reciprocably movable with drive cable 33. As can be seen in FIG. 8, a link 61 connects directly with the catch 54, which extends rearwardly to connect with the rod 65 as in FIG. 5b. Behind the locking bar part 64 a glide part 66 is also slidably provided to move longitudinally in glide track 42. The glide part 66 is then connected to one end of a push-out lever 67 of the rear height adjustment device 45 which is linked for permitting a pivoting movement around a horizontal transverse axis 68. For this purpose, a cylindrical attachment 69 of glide part 66 (see FIG. 10) engages in a complementary bore of the push-out lever 67. The part 71, which is fixed to move with the cover, is connected to the other end of push-out lever 67 by a bolt 72 on which a roller 73 is also rotatably supported. The push-out lever 67 carries yet another roller 74 the purpose of which will become apparent below in the description of the operation.

A link 77 is also provided in the area below the rear edge 76 of the roof opening 17 that interacts with the longitudinal guide mechanism 39 and is fixed with respect to the roof. Link 77 forms a cam track 78 (see FIG. 7b) directed downward and rearward and a link slot 79 positioned in front of the cam track 78. At the front portion of link 77, a recess 80 is provided (see FIGS. 5b and 6), which opens downward into glide track 42 and which, when cover 12 is in its forward position (FIG. 5b), receives the upper part of a locking bar block 82 that is guided to slide within a throughhole 83 of the forward end of glide part 66 in a direction perpendicular to the sliding direction of this glide part 66. The locking bar part 64 is also provided with an upwardly opening recess 91, wherein the recess 91 receives the lower end of locking bar block 82 When the locking bar part 64 is rearwardly slid as the cover 12 is moved to a rearward position.

Referring now to FIGS. 5a, 7a and 11, a wind deflector 102 is arranged in the area of front edge 101 of roof opening 17 and is equipped with a wind deflector plate 103, which in the embodiment according to FIGS. 5 to 11, is made as a flexible sheet metal element fixed with side parts 104 on both sides. Pins 106 and 107 are provided and are inserted into two crosswise bores 105 (see FIG. 11) of side part 104 which are spaced a distance from one another. Pins 106 and 107 project laterally outward beyond the side part 104. Together with a corresponding pin 107 provided at the side part 104 for the other side of the wind deflector 102, the pins 107 form a pivoting axis 108 running transverse to the longitudinal direction of the vehicle. For this purpose, the exposed end of pin 107 is supported to rotate in a bore 109 of a bearing block 110. The bearing block 110 is supported to slide in the longitudinal direction of the vehicle in a guide track 111 of a link 112 fixedly attached with the roof and positioned adjacent to the longitudinal guide mechanism 39 at the front end thereof. The exposed end of pin 106 is guided in a link slot 113 of link 112. The link slot 113 comprises a front section 114 that is parallel to the guide track 111 and a rear section 115 just behind the front section 114 which is slanted upward.

A tension spring 116 is extended with a degree of prestressing between a support 117 fixed with the roof and a support 118 projecting upward from the bearing block 110. The tension spring 116 is biased to pull bearing block 110 rearward along guide track 111. The pin 107 also passes through a cylindrical bore of a connecting rod 119 whose front end extends between the side part 104 and the bearing block 110, as can be best seen in FIG. 11. Pin 107 is freely pivotal with respect to the connecting rod 119. Connecting rod 119 carries at its rear end a thrust element 120 that is also guided to slide parallel to the longitudinal guide mechanism 39 by a guide part 121 also fixed with the roof. The connecting rod 119 is further provided with a link slot 122 having a front section 123 made parallel to the glide track 42 and a rear section 124 angled upward at a right angle to front section 123. The link slot 122 facilitates a link pin 125 which is fixed with the pivoted lever 46 and operates as described below to permit movement of the wind deflector 102 in conjunction with the cover 12.

The operation of the illustrated vehicle roof and the functions of the described elements are as follows.

If cover 12 is in the closed position according to FIGS. 1, 5a, 5b and 8, the pivoted lever 46 is pivoted around axis 47 into the position represented in FIG. 5a. In this position, the glide element 58 fixed with the cover 12 is grasped by the fork-like guide track 57 of pivoted lever 46 and is maintained in an upward position in which cover front edge 20 is at least almost flush with front edge 101 of roof opening 17. Further, in this cover position, the push-out lever 67 assumes an essentially perpendicular position (FIG. 5b) wherein bolt 72 brings the part 71 made with the cover 12 into a position such that the rear edge 79 of cover 12 is at least almost flush with rear edge 76 of roof opening 17. The locking bar block 82 is also engaged in the recess 80 of link 77 in this cover position. Thus, the glide part 66 is secured against sliding movements with respect to the roof and those elements fixed thereto.

As seen in FIG. 5a, a final control element 127 is provided fixed with the cover 12 to press from the rear on the thrust part 120, for keeping the latter, together with the attached connecting rod 119, in its forwardmost position against the force of tension spring 116. The final control element 127 is preferably formed as an extension of the part 71 fixed with the cover 12. The pin 107 and consequently the transverse pivoting axis 108 of wind deflector 102 are brought into their forwardmost position by the connecting rod 119 as represented in FIGS. 5a and 8. In this position, the pin 106 is located in the front section 114 of the link slot 113.

In this way, the wind deflector plate 103 is forced into the pivoted position represented in FIG. 5a within which the portion 128 of wind deflector plate 103 adjacent to pivoting axis 108 is sloped rearward and upward. The wind deflector 102 is urged forward as a whole into a receiving space 129 that lies below and in front of the front edge 101 of roof opening 17. In this rest position, the wind deflector 102 forms an air directing surface that will guide the air stream 22, indicated in FIG. 2, from the vehicle interior directly to gap 23 which is produced between the front edge 101 of roof opening 17 and the front edge 20 of cover 12 when it is lowered into the ventilation position. When the roof is opened, the pivoted lever 46 is kept in the lowered position by the link pin 125 permanently connected to the pivoted lever 46 as located in section 123 of the link slot 122.

Figure 2:
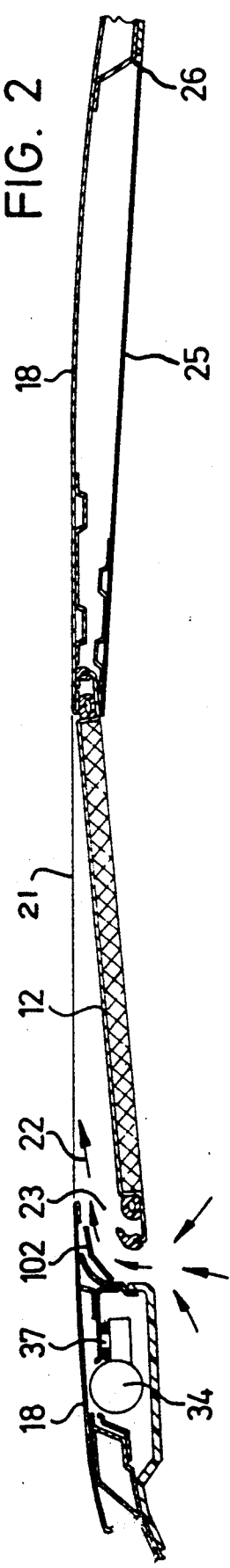
Figure 3:
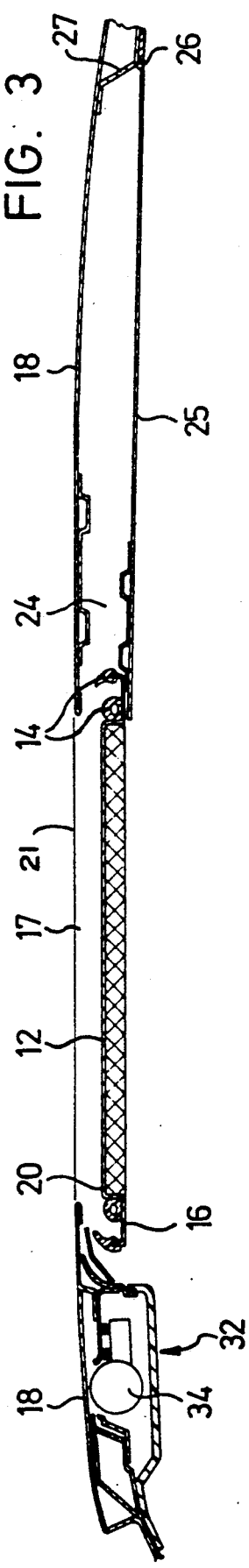

If cover 12, starting from the closed position, is brought into the ventilation position according to FIG. 2, drive cable 33 is shifted rearward from its drive-side end by drive motor 34 or crank handle 36. In doing so, the link journal 53 is shifted rearward by catch 54 along a front section 92 of the link track 52. Then as the link journal 53 is further shifted rearwardly, the link journal 53 travels along section 93 of link track 52, adjacent to section 92 and which rises to the rear; and as a result, the pivoted lever 46 is pivoted from the position represented in FIG. 5a clockwise around fixed axis 47. Furthermore, the pivoted lever 46 takes the glide element 58, which is fixed with the cover 12, downward along with it. The glide element 58 then enters into the glide track 42 by a recess 94 provided through the upper delimiting wall 95 of the glide track 42.

As a result of the pivoting movement of pivoted lever 46, the cover 12 is pivoted around a pivoting axis 98 defined by the bolts 72 from the closed position of FIGS. 1, 5a and 5b into the ventilation position of FIGS. 2 and 6. The cover front edge 20 is thereby lowered and the front end of final control element 127 is glided downwardly along the thrust part 120. In the meanwhile, the connecting rod 119 continues to be held in its front forwardmost position by the engagement between link pin 125 fixed with pivoted lever 46 and the link slot section 124. Thus, the vehicle interior can be effectively ventilated by gap 23 (FIG. 2) and the wind deflector 102 effectively directs the air stream 22 through the gap 23.

During the transition of the cover 12 from the closed position to the ventilation position, the locking bar part 64 has moved into the position illustrated in FIG. 6 wherein the locking bar part 64 has abutted against the glide part 66 to then take the latter rearward along with the former during further rearward movement. The locking bar part 64 is, of course, moved rearward by the rod 65 linked to catch 54 as catch 54 is driven rearward by the drive cable 33. Moreover, the locking bar block 82 has fallen from recess 80 and instead has been inserted with its lower end into recess 91 of locking bar part 64. In this way, the locking of the glide part 66 is released. Thus, the glide part 66 is slaved from drive cable 33 by way of locking bar block 82 locking bar part 64, rod 65 and catch 54.

With further rearward shifting of drive cable 33 from the ventilation position, the glide element 58 becomes disengaged from pivoted lever 46 since the cover 12 begins moving rearwardly by the locking bar part 64 together with glide part 66, push-out lever 67, bolt 73 and part 71. The glide element 58 thereby assumes a position within the glide track 42 through the recess 94. As push-out lever 67 is moved rearward, the engagement of roller 73 with link slot 79 causes push-out lever 67 to pivot counterclockwise (in FIGS. 5b, 6 and 7b) and roller 73 is guided by the link slot 79 into the glide track 42.

Figure 4:
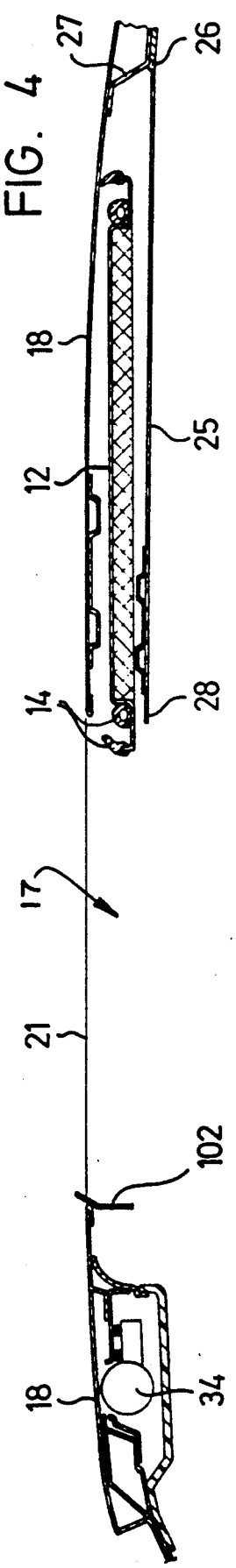

The cover 12 can now be pushed rearward parallel to stationary roof panel 18 (FIG. 4). Then, as the cover 12 begins its horizontal, rearward movement, the thrust part 120, connecting rod 119, bearing block 110 and thus pivoting axis 108 with connected wind deflector 102 also move straight to the rear under the influence of tension spring 116 synchronously along with the final control element 127. This movement is made possible because, with the lowering of the cover front edge, the link pin 125 of pivoted lever 46 is moved from the link slot section 124 downward such that link pin 125 enters section 123 of the link slot 122. During the last phase of the rearward sliding movement of the wind deflector 102, the wind deflector plate 103 is caused to be raised by means of the interaction between pin 106 and the curved rear section 115 of link slot 113 of link 112, which serves as guide part for the guide element of the wind deflector formed by pin 106. Moreover, the wind deflector plate 103 is brought into its pushed-out operating position illustrated in FIG. 7a. In this position, the portion 128 of wind deflector plate 103 is arranged perpendicular to or almost perpendicular to guide track 111, thus causing this portion 128 to form a screen that covers the gap defined below the front edge 101 of roof opening 17 from being visible from the vehicle interior. The angled top end portion 130 of the wind deflector plate 103 projects upward above the stationary roof panel 18 to thereby deflect the passing air stream upwardly.

Then, if the drive motor 34 is driven in the reverse direction the coupling between the locking part 64 and the glide part 66 will cause the cover 12 to be pulled forwardly until roller 74 strikes the cam track 78 of link 77. Further forward movement of the glide part 66 causes the push-out lever 67 to pivot clockwise (in FIG. 7b) by the interaction of roller 74 and the cam track 78. At the same time, the roller 73 will also move from the glide track 42 into the link slot 79. Moreover, the cover 12 will be forced up at the rear edge 19 (FIGS. 2 and 6) to the raised position. Here, locking bar part 64 and glide part 66 are moved forwardly to once again reach the position illustrated in FIG. 6. Further forward movement of the locking bar part 64 causes the locking bar block 82 to be pushed upward by cooperating cam surfaces. Thus, the locking bar block 82 is released from the locking bar part 64, and it is inserted into recess 80 so that the glide part 66 is again locked with respect to the link 77. Note the spring mechanism in FIG. 5b holds the locking bar block 82 in the locking position.

Figure 7B:
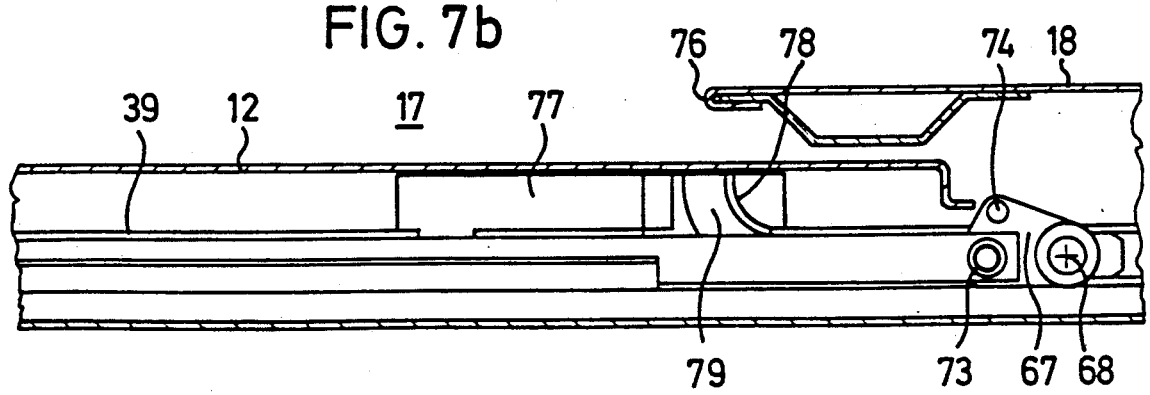

Shortly after passing back through the position illustrated in FIG. 7b, the final control element 127 abuts and forces the thrust part 120 forward with it against the bias of tension spring 116. As a result, the wind deflector pivoting axis 108 is likewise caused to be shifted forward and the wind deflector plate 103 is pivoted clockwise (FIGS. 5a and 7a) by the simultaneous interaction of pin 106 and link slot 113. The wind deflector 102 is thus pivoted into the rest position and is pushed forwardly into the receiving space 129 located in front of and below the front edge 101 of roof opening 17.

Additionally, along with the forward movement of the drive cable 33, the link journal 53 of catch 54 enters the link track 52 and moves first along its rear section 97, which runs parallel to the glide track 42 when the cover front edge is lowered. Once the link journal 53 reaches the central link track section 93, the glide element 58 fixed with the cover has entered guide track 57 of the pivoted lever 46. Further forward movement of catch 54 causes the pivoted lever 46 to pivot counterclockwise (in FIG. 5a) around fixed axis 47 due to the mutual engagement of link journal 53 and section 93 of link track 52. Cover 12 is thereby raised in front, and the cover 12 once again assumes its closed position (FIGS. 5a and 5b).

A modified embodiment of the wind deflector mechanism will now be described with reference to FIGS.

Figure 16:
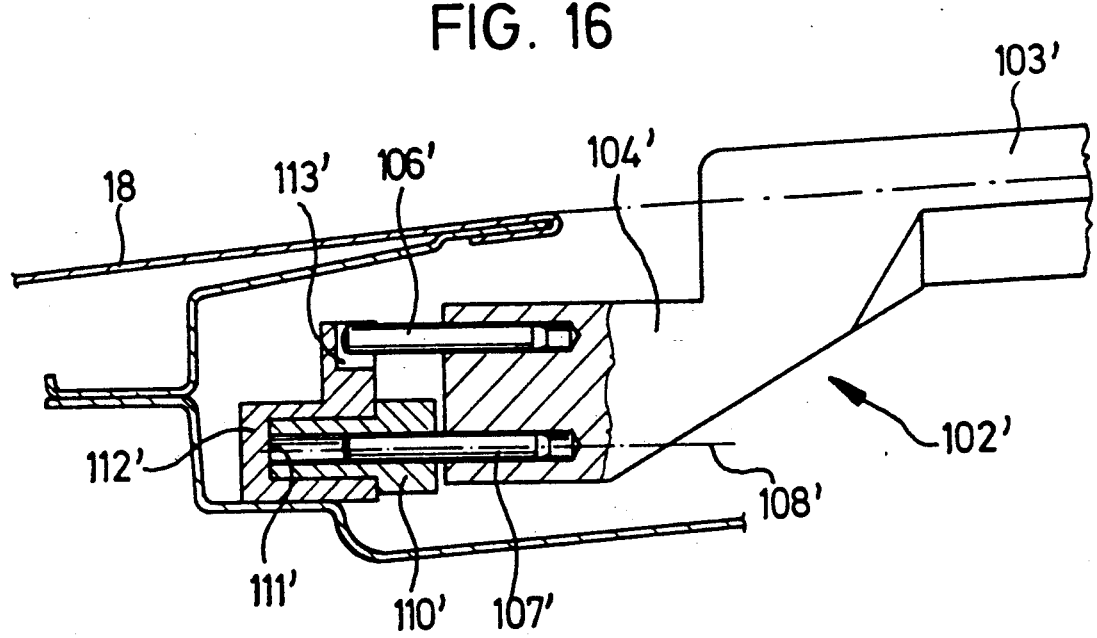
FIG. 16 is a partial cross-sectional view taken along line XVI—XVI of FIG. 12.

12-16. In this case, the wind deflector 102' is made as a molded part within which a wind deflector plate 103' and side parts 104' are integrally formed with one another. Further, this embodiment differs from the embodiment explained above essentially only in that, in order to operate the wind deflector 102' for longitudinal movement in both directions, a connecting rod 119' is automatically coupled to a final control element 127' once the cover 12 approaches its forwardmost position within a predetermined range, in the course of forward adjusting movement in the longitudinal direction of the vehicle. Conversely, the connecting rod 119' and final control element 127' are automatically uncoupled from one another once cover 12, starting from the forwardmost position, has moved rearward by a predetermined distance. To accomplish this, connecting rod 119' and final control element 127' are equipped with claws 133 and 134, respectively. If, when cover 12 is being pulled forwardly, the final control element 127' approaches the connecting rod 119' (FIG. 12), claw 134 is laid over claw 133. As soon as the final control element 127' strikes, with its front edge 135, a rear edge 136 of connecting rod 119', the connecting rod 119' is carried forwardly along with the final control element 127'. Moreover, the connecting rod 119' is raised in the rear by the interaction of a link pin 137 fixed with the roof and an additional link slot 138 provided in the connecting rod 119'. Claws 133 and 134 are thus brought into positive mutual engagement. In the meanwhile, a bearing block 110' (see FIG. 16) that in this embodiment is fixedly connected with connecting rod 119' is forced forwardly along a guide track 111' of a link 112'. The interaction of pin 106' extending from wind deflector 102' with a link slot 113' of link 112' causes the wind deflector plate 103' to be brought into the slanted position illustrated in FIG. 13 which can then be moved forward within the receiving space 129' located below stationary roof panel 18. The forward movement of the wind deflector 102' is limited by a buffer 139 fixed with the roof which abuts the connecting rod 119'.

Figure 14:
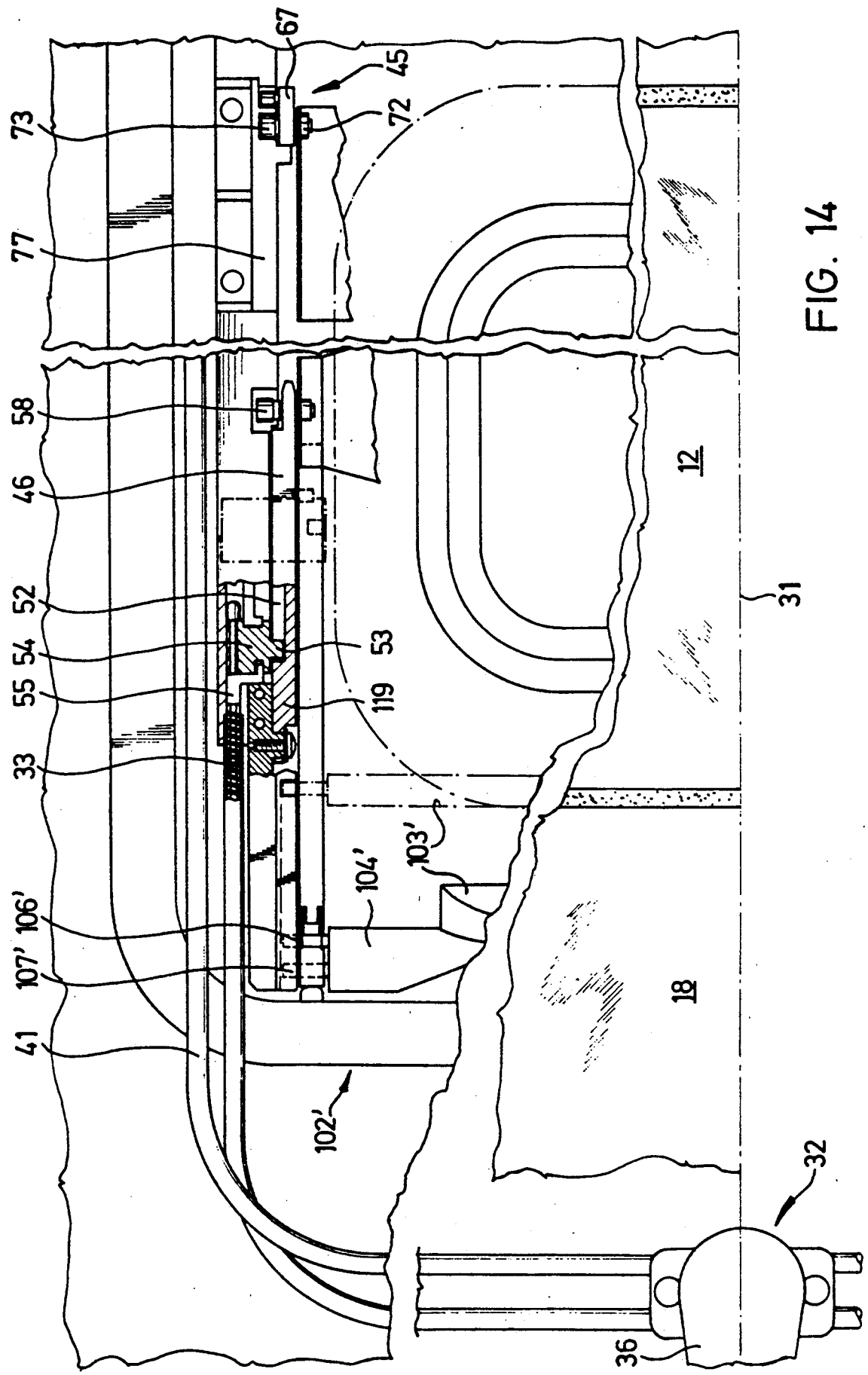
FIG. 14 is a partial top view of the roof according to FIGS. 12 and 13 with the cover in the closed position, and wherein the wind deflector plate is additionally indicated in dot-dash lines in its pushed-out position.
Figure 15:
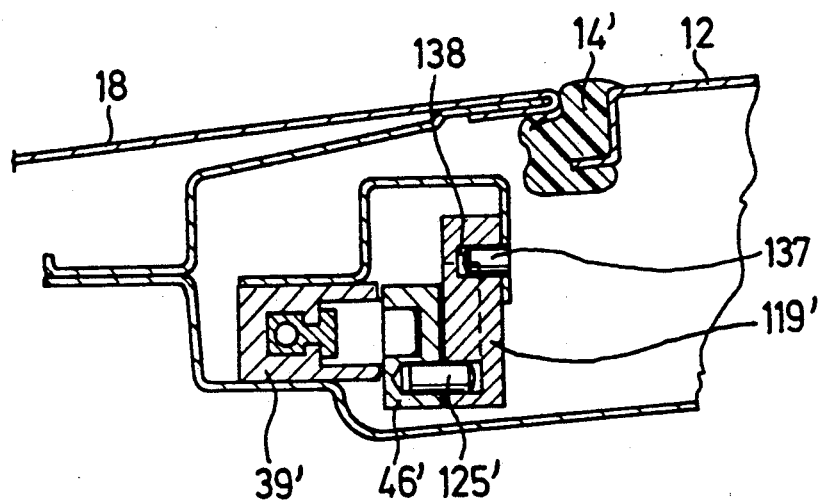
FIG. 15 is a partial cross-sectional view taken along line XV—XV of FIG. 13.

When cover 12' is pushed rearward, the connecting rod 119' is carried along with the final control element 127' by claws 133 and 134 in engagement with one another. Thus, there is no need for any means to bias the connecting rod 119' rearward as in the first described embodiment. Pivoting axis 108' of the wind deflector 102' is again shifted rearward. The insertion of pin 106' into the curved rear section 115' of link slot 113' causes wind deflector plate 103' to be positioned upright (FIGS. 12 and 16 and dashed illustration in FIG. 14). Shortly before the wind deflector 102' reaches its upright final position, the link pin 137 guides connecting rod 119' downwardly by way of a front, bent section 140 of the link slot 138. In this way, the positive locking between claws 133 and 134 is uncoupled at the set predetermined distance (FIG. 12).

Furthermore, during the last phase of the movement of the wind deflector 102' to the upright position, the movement is performed under the influence of a torsion spring 141 that acts against pin 106' and is braced forward against the connecting rod 119'. The torsion spring 141 thus biases the connecting rod 119' against a stop (not represented) of link 112'. Pivoted lever 46' is fixed in position by a link slot 122' of the connecting rod 119' and by link pin 125' fixed with the pivoted lever 46' so that, when cover 12' is closed, glide element 58 on final control element 127' again cleanly passes through fork-shaped guide track 57.

The wind deflector arrangement explained above in connection with a ventilation roof is also suitable for any of other known roof types with at least one roof opening that can be closed by a covering, for example for sliding roofs, sliding-lifting roofs, spoiler roofs, and folding roofs.

We claim:

1. A vehicle roof including a stationary roof panel with a roof opening therethrough, a cover for alternately closing and at least partially opening said roof opening, said cover connected to the roof panel by adjustment means for providing an adjustment movement of the cover in a longitudinal direction of the vehicle roof, a wind deflector which is pivotally mounted to said stationary roof panel about an axis transverse to the longitudinal direction of the vehicle roof by a pivot means for permitting pivotal movement of the wind deflector between a pushed-out position and a rest position, a guide means for permitting sliding movement of said pivot means in the longitudinal direction of the vehicle roof so that the transverse axis can be longitudinally positioned at a plurality of positions, and a catch means for automatically moving the transverse axis of the wind deflector along said guide means in the longitudinal direction of the vehicle roof between said plurality of positions during at least a part of the adjustment movement of the cover in the longitudinal direction of the vehicle roof, wherein said wind deflector is positioned within a receiving space defined below a portion of the stationary roof panel in front of a front edge of the roof opening in said rest position.

2. The vehicle roof according to claim 1, wherein said catch means includes a thrust element movable on said guide means on both sides of said roof opening, and each said thrust element is brought into detachable engagement, in at least one direction of movement of the cover, with a final control element that is connected to said cover and is movable therewith in the longitudinal direction of the vehicle.

3. The vehicle roof according to claim 2, wherein each said thrust element is elastically biased along said guide means toward a position in which said thrust element causes the transverse axis of said wind deflector to move rearward into a position lying near a front edge of said roof opening, and said final control element abuts said thrust element to carry said thrust element forward therewith against the force of the elastic bias when the cover approaches a forwardmost position in the course of the adjustment movement of the cover in the longitudinal direction of the vehicle roof.

4. The vehicle roof according to claim 2, wherein said thrust element is automatically coupled to said final control element by a cooperating means for longitudinal movement therewith in either direction when the cover, during the course of its adjustment movement in the longitudinal direction of the vehicle roof, has approached a forwardmost position within a predetermined range, and means causing said cooperating means to automatically release when the cover, starting from the forwardmost position, has moved rearward by a predetermined distance.

5. The vehicle roof according to claim 3, wherein a pivoting mechanism is further provided that forces a pivoting movement on said wind deflector during the course of the sliding movement of said transverse axis.

6. The vehicle roof according to claim 4, wherein a pivoting mechanism is further provided that forces a pivoting movement on said wind deflector during the course of the sliding movement of said transverse axis.

7. The vehicle roof according to claim 5, wherein said pivoting mechanism comprises, on both sides of roof opening a guide part which is fixed to the vehicle roof and provided with means for interacting with a guide element extending from said wind deflector, said guide element being located at a spaced distance from the transverse axis of said wind deflector, and said means for interacting with said guide element causes said wind deflector to be pivoted between the pushed-out position and the rest position as a function of a shifting of the transverse axis in the longitudinal direction of the vehicle roof.

8. The vehicle roof according to claim 6, wherein said pivoting mechanism comprises, on both sides of roof opening a guide part which is fixed to the vehicle roof and provided with means for interacting with a guide element extending from said wind deflector, said guide element being located at a spaced distance from the transverse axis of said wind deflector, and said means for interacting with said guide element causes said wind deflector to be pivoted between the pushed-out position and the rest position as a function of a shifting of the transverse axis in the longitudinal direction of the vehicle roof.

9. The vehicle roof according to claim 2, wherein said wind deflector is made so that, in the pushed-out position, said wind deflector also acts as a screen that covers a space located below a front edge of said roof opening when said roof opening is at least partially opened.

10. The vehicle roof according to claim 2, wherein means for pivoting said cover in a forwardmost position thereof about a second transverse axis located near a rear edge of said cover between a closed position and a ventilation position in which a cover front edge is positioned at a distance below a plane at the stationary roof panel while said cover rear edge is kept at least approximately at the height of said stationary roof panel, said adjustment means being operable for sliding said cover, after lowering said rear edge, rearward below the stationary roof panel into the open position of the roof opening where said opening is at least partially opened, and means for holding the transverse axis of said wind deflector in a forwardmost position during the movement of said cover between the closed position and the ventilation position, are provided.

11. The vehicle roof according to claim 10, wherein said wind deflector is made so that said wind deflector when urged into said receiving space and in its forwardmost position forms an air directing surface that guides an air stream from the vehicle interior directly to a gap which is produced between a front edge of said roof opening and a front edge of said cover when lowered into the ventilation position.

* * * * *